United States Patent

[11] 3,579,239

| [72] | Inventors | William O. Purcell, Jr.<br>Maitland;<br>Walter D. Trippe, Orlando, Fla. |
|---|---|---|
| [21] | Appl. No. | 471,523 |
| [22] | Filed | July 13, 1965 |
| [45] | Patented | May 18, 1971 |
| [73] | Assignee | Martin-Marietta Corporation<br>Middle River (Baltimore County), Md. |

[54] ANGULARLY SELECTIVE MONOPULSE RECEPTION
20 Claims, 5 Drawing Figs.

[52] U.S. Cl............................................................ 343/16SD
[51] Int. Cl............................................................ G01s 9/22
[50] Field of Search............................................. 343/16, 16.1

[56] References Cited
UNITED STATES PATENTS
| 3,153,234 | 10/1964 | Begeman et al. .............. | 343/16 |
| 3,167,761 | 1/1965 | Le Parquirr ................... | 343/7 |

Primary Examiner—Rodney D. Bennett, Jr.
Assistant Examiner—Nelson Moskowitz
Attorneys—Julian C. Renfro and Gay Chin

ABSTRACT: This invention relates to an angularly selective monopulse system for receiving desired pulse signals, having means for determining whether an incident pulse was received from within a desired angular range. If not so received, the pulse is rejected, but if it was so received, it is further processed and the information it provides is utilized for appropriately adjusting the center of the acceptance sector. This information may also be used for the physical steering of the vehicle or missile upon which it may be mounted.

INVENTORS
WILLIAM O. PURCELL, JR.
WALTER D. TRIPPE

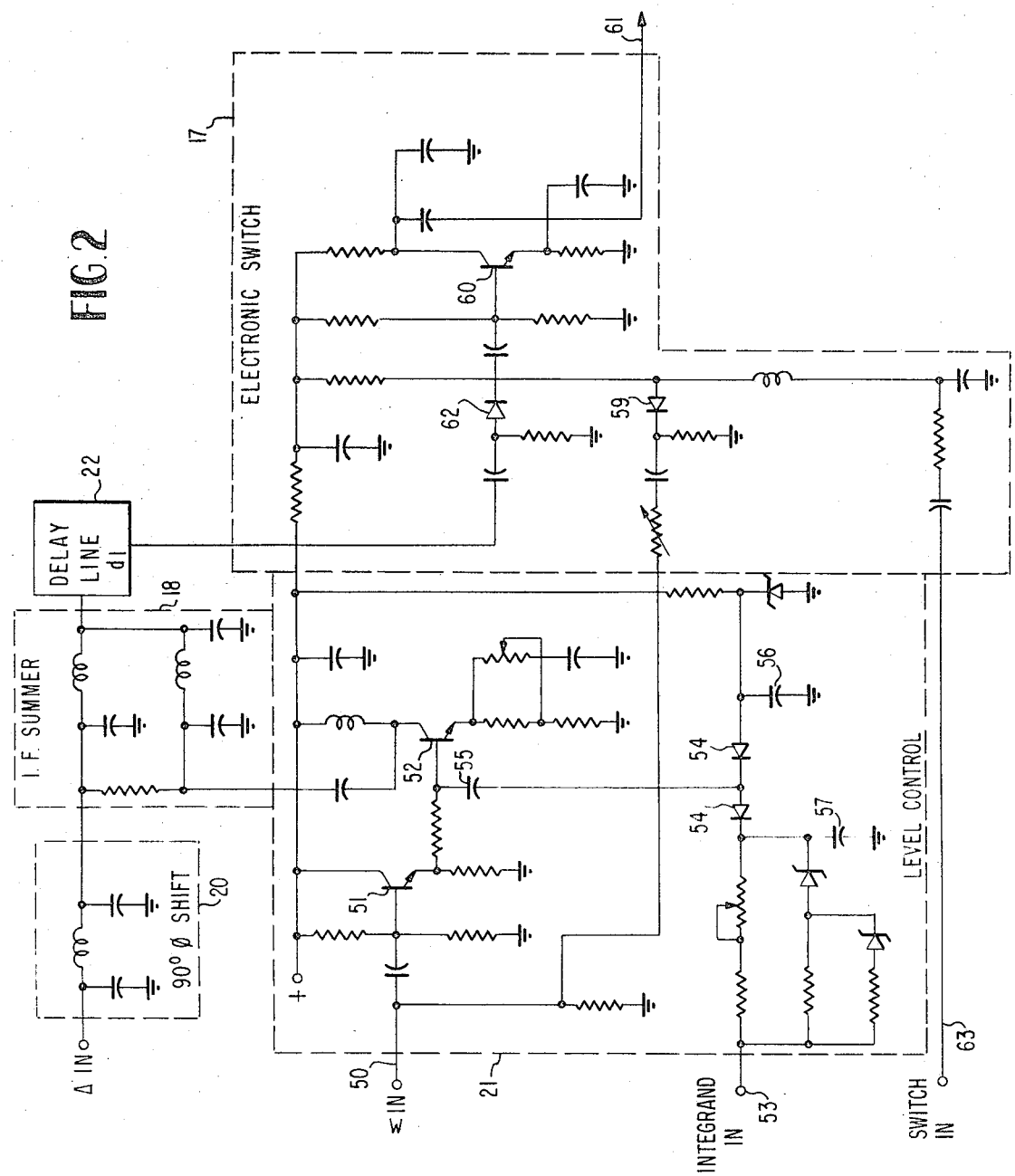

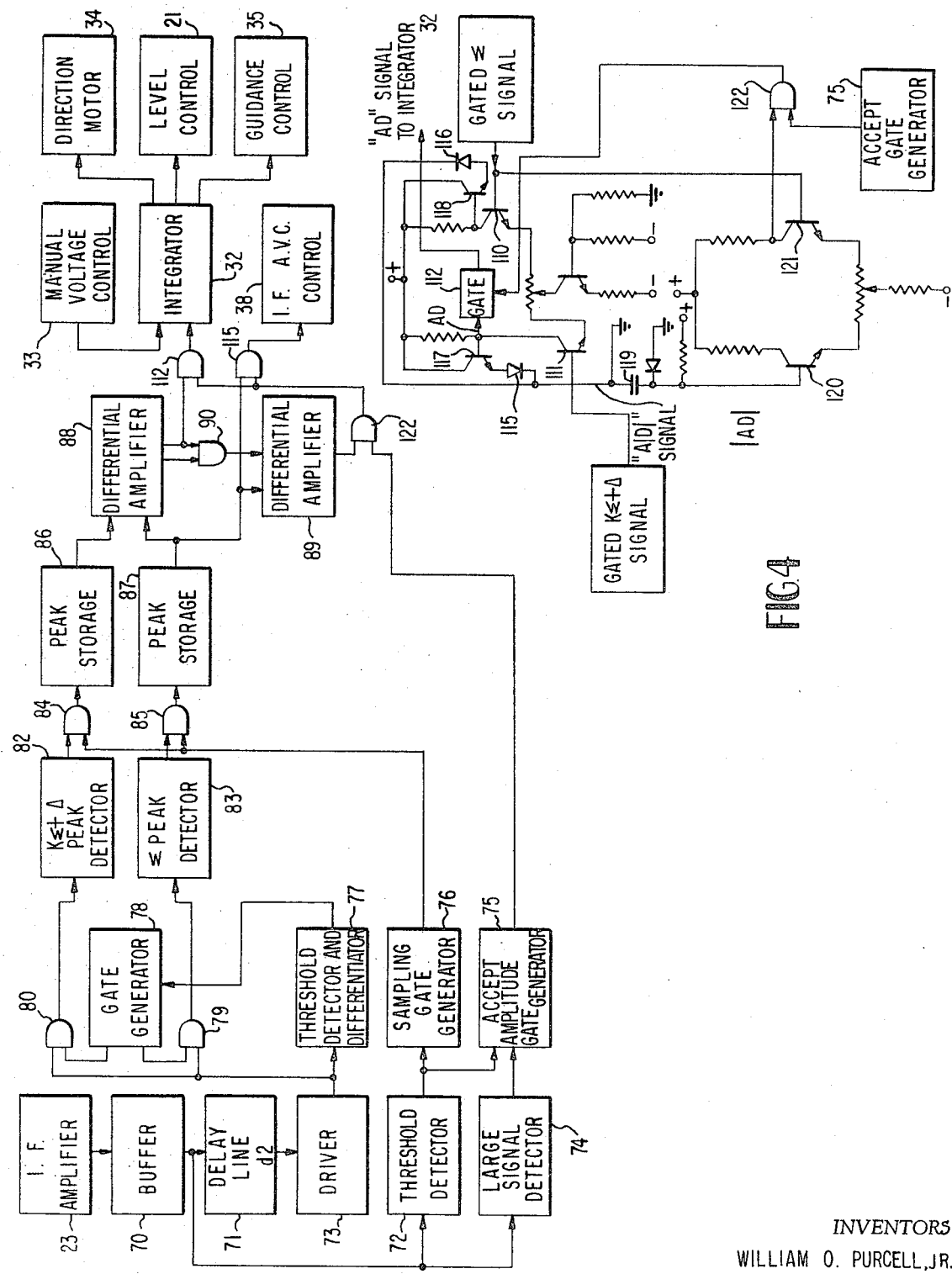

FIG.5
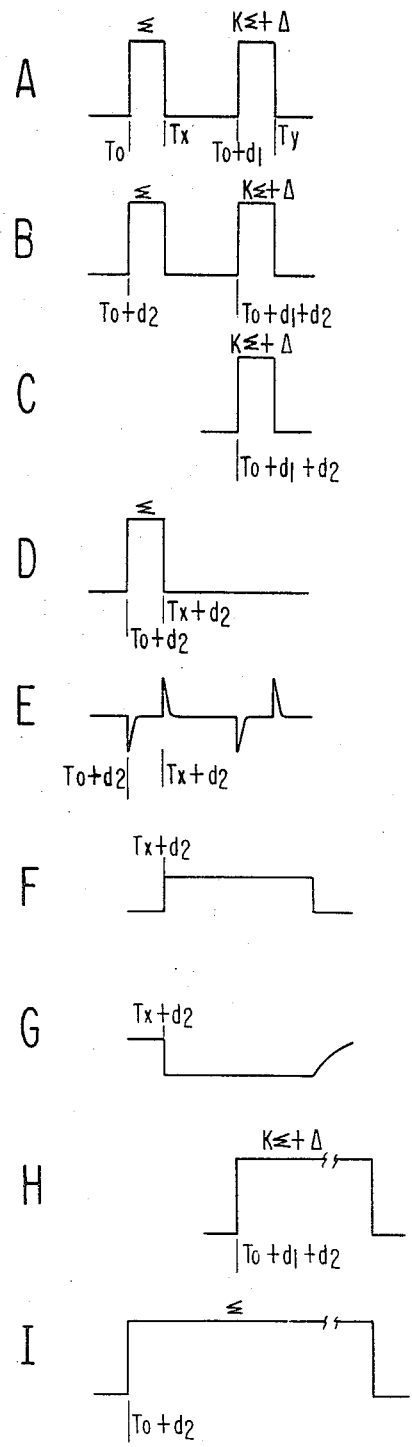
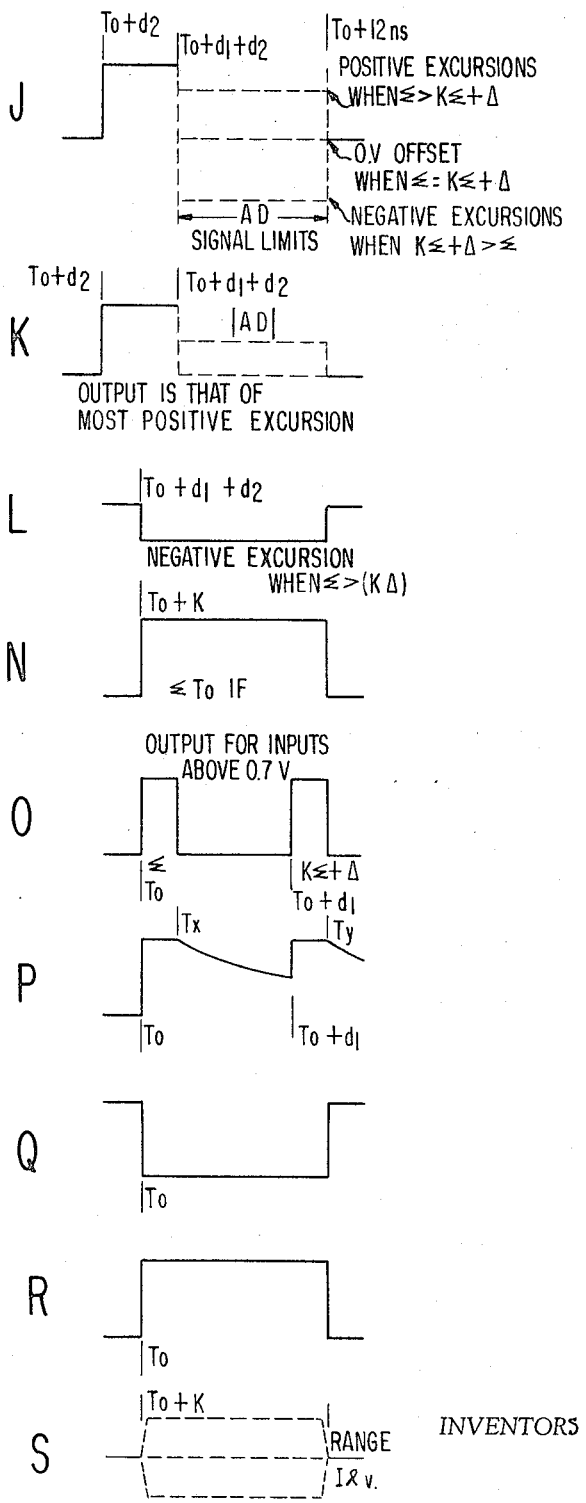

ANGULARLY SELECTIVE MONOPULSE RECEPTION

The present invention comprises novel methods and apparatus for angularly discriminating between pulses received on a monopulse system. The system provides an analog angle information signal directly usable for guidance, if desired.

Monopulse receiving systems characteristically employ, for single plane directivity, a pair of spaced antenna systems whose respective output signals are relatively phase displaced in accordance with the incident angle of the received wave with regard to the antenna array. By well-known expedients, the sum and difference signals may be derived separately for further processing. The present invention operates in a highly simplified and efficient manner to determine the incident direction, which may be set to receive desired pulses over a desired restricted angular sector, and reject other pulse signals from directions of incidence outside such range. The invention, moreover, provides for steering the angularly selective gate to conform with variation in the direction of the desired signals, while maintaining discrimination against received signals lying outside the desired angular gate. The invention develops a control voltage characteristic of the directivity of the desired incident signals with respect to the antenna array which permits steering the system, or a vehicle upon which it is mounted, in conformance with this angular information.

In achieving these objectives, the system operates to compare the sum signal $\Sigma$ with a combined signal amplitude comprising the difference signal $\Delta$ and a controlled fraction of the sum signal, $K\Sigma$. Using the approximation that the angle of arrival, $\theta$, is equal to the ratio of the difference to the sum signals, the directional deviation is proportional to the value of $k$ required to equalize the two pulse amplitudes referred to. If, then, $\Sigma = K\Sigma + \Delta$, then $K = 1 - \Delta/\Sigma$. Therefore, $k$ changes linearly with direction, and is that portion of the sum signal which must be added to the difference signal to make the amplitude of the $\Sigma$ and the $K\Sigma + \Delta$ signals equal.

The present invention provides for substantially instantaneously determining whether an incident pulse was received from within the desired angular range. If not so received, the pulse is rejected. If it was received, it is further processed within the system and, if it has been received from a different direction centrally of the angular range for desired reception, the latter is appropriately adjusted to center the acceptance sector on the new direction of reception. For this purpose, angular "error" signals, if developed, are supplied to an integrator whose output voltage controls the factor $k$ for varying the gain or attenuation of an appropriate circuit.

Since the integrand output of the integrator is direction-dependent, it can be used as an analog control voltage dependent upon the angle of reception for physically steering the monopulse system, particularly when the same is mounted on a moving vehicle.

The system of the present invention permits substantial simplification in the receiver system, relative to other arrangements which have sought to achieve the same objectives. For instance, the received pulses may be amplitude gated in dependency on the sum pulse amplitude level to prevent the processing of undesired signals. As will further appear, this prevents system response to difference-dependent pulse signals which might otherwise produce spurious response. At the same time, a reduction of effective receiver noise bandwidth to a fraction of normal values may be achieved.

Since receivers of the present invention operate to equalize the pulse amplitudes of the $\Sigma$ and the $K\Sigma + \Delta$ pulses, the linearity of the amplitude characteristics of the receiving system, and particularly the intermediate frequency amplifier, are greatly relaxed. In some monopulse receiver systems, it may be necessary to compare amplitudes of two sets of pulses whose absolute levels are multiples of each other, in instances differing by as much as a magnitude. Such systems obviously require stringent design with respect to linear amplification, as compared to the relative simplicity of the present invention. In fact, with close automatic gain control, the predominant amplification of both signals may be caused to occur over a substantially restricted absolute voltage range, which particularly simplifies amplifier linearity design.

The present invention may be advantageously practiced with leading edge gating of the received pulses to enhance the accuracy of the directional information, by avoiding multipath transmission with its resultant uncertainty in accuracy of directional information. Where these expedients are suggested in the intended environment of application, it is especially advantageous to incorporate Leading Edge Gating according to the invention of Walter D. Trippe, as described in application Ser. No. 468,897, filed July 1, 1965 (Martin Docket 64 YC-117), now U.S. Pat. No. 3,432,757.

It is accordingly the primary object of the present invention to provide angular selectivity in monopulse reception.

Another primary objective of the present invention is to provide for automatically varying the direction of the acceptance sector with changes in direction of a received sequence of signals.

It is a further object of the invention to steer the receiving system, or the moving vehicle upon which it is positioned, in accordance with the angular information provided by the system. The invention will further be understood with reference to the specific embodiment shown in the attached drawings, in which:

FIG. 2 is a circuit diagram of components of the IF processor,

FIG. 3 is a block diagram detailing the components of the video processor,

FIG. 4 is a circuit diagram of some components of the video processor, and

FIG. 5 shows waveforms representative of system operation.

Figure 1:
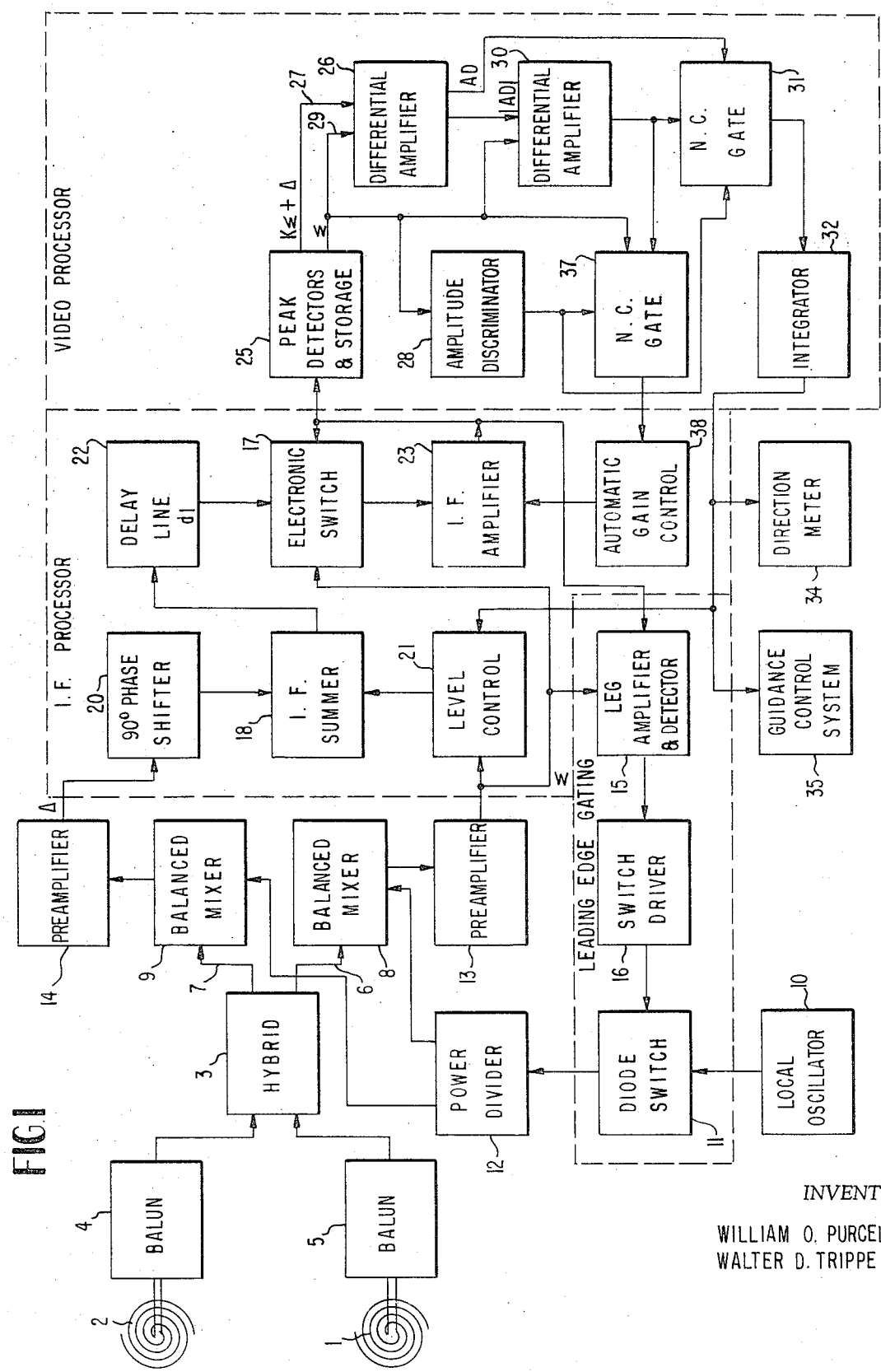
FIG. 1 is a generalized block diagram of the overall system.

In the block diagram of the system, as shown in FIG. 1, a pair of balanced antennas 1 and 2 are provided in the desired spatial separation. The transmission line network from the antennas to hybrid 3 includes transition elements 4 and 5 for appropriately coupling the signals from the antennas. Hybrid 3 supplies a sum signal at channel 6 and a difference signal at channel 7, fed respectively to balanced mixers 8 and 9.

Local oscillator 10 feeds the balanced mixers through diode switch 11, provided for leading edge gating, and power divider 12. Preamplifiers 13 and 14 are respectively provided at intermediate frequency for the sum and difference signals.

THe sum pulse from preamplifier 13 is supplied to a leading edge gating amplifier 15, and if of a sufficient amplitude, operates diode switch 11 through switch driver 16 to terminate the output pulse from the mixers at the end of the leading edge gating period, which in the specific environment of the examples was selected at a desired value of 0.2 microseconds. If the received pulse is of insufficient amplitude, as further explained in the above referenced patent of Walter D. Trippe, the pulses to the preamplifiers may be terminated only after a longer delay, or upon the first output received from the main intermediate frequency amplifier 23.

The sum signal from preamplifier 13 is directly applied to electronic switch 17 whose circuitry comprises means for transmitting the $\Sigma$ pulse. If the $\Sigma$ pulse is of sufficient amplitude, as delivered by the IF amplifier, to trigger a keying monostable multivibrator (not shown), the switch becomes operative to conduct the $K\Sigma + \Delta$ signal thereafter for time multiplex processing.

For the purpose of providing the desired $K\Sigma + \Delta$ combined signal, the pulse output from preamplifier 14 is supplied to intermediate frequency summer 18 through a 90° phase shifter 20.

The summer also receives the $\Sigma$ pulse signal from preamplifier 13 through the $k$ level control 21. This circuit operates to deliver the $\Sigma$ signal to the summer at a level varied linearly with a control voltage. The circuit may accordingly comprise an electronically responsive variable gain amplifier, as will be later discussed.

The combined signal from summer 18 is delayed in line 22 to permit a time multiplex output from electronic switch 17. In a specific example, a 2-microsecond delay line was employed. The successive signals from switch 17, each pair resulting from the reception of the leading edge of a pulse at antennas 1 and 2, is then supplied to intermediate frequency amplifier 23.

Peak detector 25 provides for separately peak detecting the $\Sigma$ and $K\Sigma+\Delta$ pulse amplitudes, and storing these voltages over a predetermined period during which simultaneous sampling is accomplished for applying these voltage amplitudes to a first differential amplifier 26. For this purpose, the combined signal is delivered through line 27 and the sum signal is applied through line 28.

Differential amplifier 26 and its associated circuitry supplies two output signals. One of these signals is characteristic of D, the difference between the $\Sigma$ signal and the $K\Sigma+\Delta$ signal amplitudes. The D characteristic signal is therefore of an amplitude and polarity characteristic of this difference. The second signal provided by the first differential amplifier 26 is characteristic of the absolute value of the difference between the sum and combined signals, $|D|$. The latter signal is of constant polarity but varying amplitude, equal in amplitude to the D signal.

The actual output voltages from differential amplifier 26 are increased multiples, by its amplification factor A, of the numerical values of the difference between its input signals. The differential amplification may be conveniently employed to set the width of the acceptance angle sector, which is determined by the relationship of the $\Sigma$ pulse amplitude to $A|D|$. Where the amplitude of the sigma pulse is greater than $A|D|$, the received signal is incident within the acceptance angle sector and the directional information is accordingly utilized by the system. In order to determine this relationship, a second differential amplifier 30 receives simultaneously the stored $\Sigma$ pulse from peak detector 25 and the $A|D|$ output voltage from the first differential amplifier. The output of the second differential amplifier 30 is a gating pulse supplied if $\Sigma$ is greater than $A|D|$. This gating pulse output is applied to a normally closed gate 31, which receives the D characteristic voltage signal from differential amplifier 26, and if the gating voltages are present from differential amplifier 30 and amplitude discriminator gate generator 28, transmits the D pulse to integrator 32. In the absence of D pulse output to integrator 32, the latter maintains its output control voltage unchanged. The integrand output is additionally controlled by voltage source 33 for manually setting the acceptance gate angle, which may later vary under changing acceptable pulse direction.

In the event that the direction of the received pulse has changed from that of the preceding acceptable pulse, the amplitude of signal AD from differential amplifier 26 will have a finite value, and if applied through the second normally closed gate 31, will cause integrator 32 to vary the integrand value in an amount and direction to equalize the $\Sigma$ and the $K\Sigma+\Delta$ signal amplitudes through appropriate adjustments of the input control voltage to level control 21.

The integrand voltage output of integrator 32 manifestly comprises an analog of the angle at which acceptable pulses are received on antenna array 1—2. Consequently, this voltage may be directly applied to a direction indicating meter 34, if desired.

The integrand voltage is applied directly as angular information to guidance system 36, for physically steering the system or the vehicle or missile on which it is mounted.

In order to maintain the sum and combined pulse signals applied to the video processor at the desired levels, acceptable $\Sigma$ pulses, or the stored signals representing their peak values, are gated through normally closed gate 37 to the automatic gain control circuitry 38 for intermediate frequency amplifier 23. Normally closed gate 37 conducts the peak $\Sigma$ voltage values supplied from differential amplifier 30 when $\Sigma$ is greater than $A|D|$. Consequently, output voltage levels of the $\Sigma$ and the $K\Sigma+\Delta$ pulses sequentially delivered from amplifier 23 are maintained at a nearly constant value. As noted above, the amplitude comparison of peak pulse amplitudes effectuated in the present invention greatly relax the amplitude linearity requirements encountered in other systems.

A number of components involved in the IF processor are shown in detailed circuitry in FIG. 2. Most of the components, as shown, are self-explanatory, including phase shifter 21, IF summer 18, and delay line 22. The level control circuit 21 receives the $\Sigma$ pulse at terminal 50 from preamplifier 13. The input signal is amplified by emitter follower 51. A portion of the output of the emitter follower is applied to the base of transistor 52. The signal developed at the base of transistor 52 represents a controlled voltage divided output from emitter follower 51, in which the effective output percentage is determined by the polarity and amplitude variations in the DC potential applied to terminal 53. The control voltage varies the effective impedance to ground from the base of transistor 52 through condenser 55, series diodes 54, and condensers 56 and 57. The collector output from transistor 52 is connected to terminal 58 of the IF summer.

The electronic switch 17, shown in detail in FIG. 2, normally couples the $\Sigma$ pulse through diode 59 and transistor 60 to the intermediate frequency input line 61. In the absence of other signals, the combined signal from delay line 22 is decoupled by the reverse steady bias on diode 62.

However, if a desired amplitude $\Sigma$ pulse is supplied by intermediate amplifier 23 in FIG. 1 to the switch gating monostable multivibrator (not shown), a positive gating signal is developed and supplied to terminal 63. This voltage provides forward bias on diode 62, so that the combined pulse from delay line 22, at the time of its appearance, is effectively coupled to the base of transistor 60 and through line 61 to the IF amplifier 23.

In FIG. 5 are shown representative waveforms at various points in the IF processor and in the video processor. At A is shown a typical $\Sigma$ signal followed by a combined $K\Sigma+\Delta$ pulse delayed from the leading edge of the $\Sigma$ pulse by the delay time of delay line 22. Where, as in the present system, the delay between the $\Sigma$ and the $K\Sigma+\Delta$ pulses is established at 2 microseconds by delay line 22, the positive gate pulse applied to terminal 63 of FIG. 2 is preferably a 3-microsecond pulse developed by a monostable multivibrator at the collector of a normally blocked transistor, which is triggered into conduction for the desired period in response to a $\Sigma$ pulse of adequate amplitude delivered at the output of intermediate frequency amplifier 23.

In FIG. 3 are shown, in block diagram, the more important components and their operational interconnections in the video processor. The output from IF amplifier 23 (waveform A, FIG. 5) is applied through a buffer amplifier stage 70 to a delay line 71. Delay line 71 effects sufficient delay in the intermediate frequency output pulse sequence so that suitable switching operations may be achieved in response to the undelayed output of voltage amplifier 70 as applied to threshold detector 72 and large signal detector 73 for amplitude discrimination. The output of delay line 71 is shown at B, FIG. 5, and is applied to a driver amplifier and DC restorer network 73.

Under the operation of the leading edge gating amplifier 15 and diode switch 11, the duration of both the $\Sigma$ and the $K\Sigma+\Delta$ pulses (FIG. 5) may in the specific instance be 0.2 or 0.8 microseconds, according to the received signal strength at antennas 1 and 2. The threshold detector 72 receives these pulses and comprises a differential amplifier and DC restorer which, in response to an input signal amplitude in excess of a preselected value (0.7 volts in a particular instance), supplies the output triggering pulses of FIG. 5, O. These pulses trigger a monostable multivibrator constituting the amplitude acceptance gate generator 75 which supplies, in this particular instance, a 10-microsecond pulse for utilization as described below. Its output is shown at FIG. 5, R.

In certain environments, it may be desirable to inhibit the operation of the acceptance gate generator 75 on unduly large signals. For this purpose, large signal detector 74, in such an instance, will include a reverse biased diode where the magnitude of the reverse bias is set to allow pulses greater than a predetermined amplitude to exceed the same. When this occurs, the circuit develops a stretched inhibiting signal maintaining the normally conductive transistor of the accept amplitude gate generator in conduction for a period of time exceeding the duration of the Σ and KΣ+Δ sequence, to prevent its operation in response to the output of threshold detector 72. This inhibit signal is shown at FIG. 5, P.

Sampling gate generator 76 is operated responsively to the output of threshold detector 72 to supply, in the specific instance, a 12-microsecond sampling pulse initiated immediately preceding the slightly delayed output of delay line 71. Its output is shown at FIG. 5, Q.

The output from driver and DC restorer network 73 (FIG. 5, B) is applied to threshold detector and differentiator 77 to develop the triggering waveform shown at FIG. 5, E, where the positive pulses coincide with the trailing edges of the Σ and KΣ+Δ pulses. The first positive pulse triggers monostable gate generator 78, supplying output waveform G, FIG. 5, to block gate 79 of the Σ channel, and waveform F, FIG. 5, to open normally closed gate 80 of the KΣ+Δ channel.

Consequently, the KΣ+Δ and the Σ waveforms, shown respectively at C and D of FIG. 5, are applied respectively to peak detectors 82 and 83. The peak detectors comprise emitter followers whose emitters are normally shunted to ground by series transistors constituting normally blocked gates 84 and 85. The gating transistors are unblocked by sampling gate generator 76 (FIG. 5, Q) for 12 microseconds beginning before receipt of the Σ pulse. This permits charge of the storage condensers 86, 87, through the emitter followers 82, 83, which present high impedance discharge paths across the storage condensers after peak charge is reached. The peak storage voltages are applied as discussed below for further processing, and are cleared at the end of the gating pulse (FIG. 5, Q) prior to the succeeding Σ pulse.

The outputs of the peak storage capacitors 86 and 87 are respectively shown at FIG. 5, H and I. These potentials are applied to a differential amplifier 88 shown in detailed circuitry in FIG. 4. The differential amplifier supplies two characteristic output signals, one characteristic of the difference D between the Σ and the KΣ+Δ amplitudes. The value of this output signal is AD, where A represents the amplification of the differential amplifier 88. The network also includes circuitry to provide an output signal of an amplitude characteristic of the absolute value of the difference between the respective input signals, |D|. This is a unipotential signal of an amplitude the same as D, but of a preselected polarity. In the circuit of FIG. 4, the gated KΣ+Δ and Σ voltages, (FIG. 5, H and I, respectively) are applied to the bases of transistors 111 and 112 of the differential amplifier. The AD signal is then present at the collector of transistor 111 and is available for transmission through normally blocked gate 112. The AD signal is shown at FIG. 5, J.

OR gate 90 (FIG. 3) comprises diodes 115 and 116 (FIG. 4) driven by emitter followers 117 and 118 to develop a signal proportional to the most positive excursion of the collectors of transistors 110 and 111 across condenser 119 to develop the signal A |D| at the base of transistor 120. The A |D| signal is shown at FIG. 5, K. (Transistors 120 and 121 constitute differential amplifier 89 of FIG. 3). Transistor 120 is coupled in a differential amplifier network with resistor 121 to whose base the gated Σ voltage of FIG. 5, I is applied. If the latter signal is greater than the amplitude of the A |D| signal, a negative "accept angle" gating signal (FIG. 5, L) is developed at the collector of transistor 121 for operation of gate 122. The differential amplifier of FIG. 5 comprising transistors 120 and 121 is shown at 89 of FIG. 3 where gate 122 also appears. Gate 122 is coupled to the accept amplitude gate generator 75 and provides an operational output gating voltage when the input pulses are within acceptable amplitude range and within the acceptance angle sector for the monopulse signal. For this purpose AND gate 122 supplies an enabling signal to gate 112 which then transmits to integrator 91 the D signal shown in FIG. 5, S.

It will be appreciated that by operation of the second differential amplifier, the "accept angle" gate signal is generated when Σ is greater than A |D|. The acceptable angle sector will therefore be decreased as the gain A is increased. The gain inserted prior to the second differential amplifier may obviously be controlled by a variety of expedients. Within the circuitry of FIG. 4, decreasing the value of the collector resistors for transistors 110 and 111 will decrease the gain A and increase the width of the acceptable angle of reception.

Now returning to FIG. 3, it has been mentioned that it is desirable to control the gain of the intermediate frequency amplifier automatically in dependency on the amplitude of acceptable Σ pulses. For this purpose, gate 115 receives the Σ pulse amplitude signals from peak storage condenser 87 and may be gated into conduction by the accept signal from gate 122 under desired conditions. Therefore, gate 115 supplies the intermediate frequency automatic volume control network 38 signals (FIG. 5, N) of the desired amplitude for controlling the gain of intermediate frequency amplifier 23.

Manual voltage control 33 is also shown in FIG. 4 for feeding an initial setting signal into the input of integrator 32 for establishing a desired acceptance sector for reception.

The integrator output, as described above, is applied to terminal 53 in level control 21. The same output voltage may be applied to direction indicator 34, a voltmeter calibrated directly in the directivity angle of reception. Since the signal delivered by integrator 32 is of a polarity and amplitude characteristic of the direction of reception, this signal may also provide analog angle information to a guidance control system 35 for the installation or its vehicle.

As indicated in the appended claims, the present invention may be applied to angular discrimination for receiving pulse signals over a desired preselected angular range with respect to the antenna installation. Additionally, if desired, the system may be employed to lock onto successive signals received within the preselected or existing angle gate, and follow signals form said source as it shifts its incident angle relative to the receiving system, whether this variation in direction of reception should be caused by movement of the source or of the receiving system. While the invention has been described in a preferred embodiment designed with respect to a particular application, the scope of the invention is to be determined with respect to the scope of the appended claims.

We claim:

1. In a monopulse receiver system:
   a sum signal channel,
   a sum and difference signal channel,
   comparator means for comparing the channel signal amplitudes,
   signal level control means responsive to the comparator means operative to equalize the channel signals, and
   signal rejection means operative to prevent response of the signal level control means to signals having a difference between sum and sum and difference levels outside a predetermined range.

2. The system of claim 1 wherein:
   the signal level control means comprises means for varying the sum component of the sum and difference channel signal.

3. The system of claim 1 wherein:
   the signal rejection means comprises further means responsive to the difference between the sum signal and a multiple of the absolute value of the difference between the sum and the sum and difference signals.

4. The system of claim 3 wherein:
   the comparator means comprises means supplying a signal characterizing the difference between the sum and sum and difference upon operation of the further means.

5. The system of claim 3 wherein:
   the comparator means comprises means supplying a signal characteristic of the sum signal upon operation of the further means.

6. An angularly selective monopulse system for receiving desired recurrent pulse signals comprising:
   a sum signal channel, a difference signal channel, summing means for combining the difference signal with a controlled fraction of the sum signal to provide a combined signal, means for rejecting said pulse signals when the sum signal is less than a multiple of the absolute value of the difference between the sum and combined signals, and means utilizing said pulse signals when the sum signal is greater than the multiple of the absolute value of the difference between the sum and combined signals.

7. The structure of claim 6 further comprising:

means integrating signals characterizing the difference between the sum and combined signals when the sum signal is greater than the multiple of absolute value of the difference between the sum and combined signals, and control means for the summing means operating in dependency on the integrand to vary the controlled fraction of the sum signal to maintain angular selectivity for said desired signals.

8. An angularly selective monopulse system for receiving desired recurrent pulse signals comprising:

a sum signal channel, a difference signal channel, summing means for combining the difference signal with a controlled fraction of the sum signal to provide a combined signal, means for delaying the combined signal, means for sequentially feeding the sum and combined signal to a third channel, means for amplifying the third channel signal, means responsive to the amplified signals to supply a signal characterizing their difference D And a unipotential signal characterizing the absolute value of their difference $|D|$, comparator means operative to compare the sum signal to a predetermined multiple of the $|D|$ signal, and means responsive to the comparator means for rejecting said pulse signals if the sum signal is less than the multiplied $|D|$ signal to discriminate against pulses received outside an angular range from which the desired signals are incident.

9. The system of claim 8 further including:

integrator means, means responsive to the comparator means to transmit a signal characterizing the D Signal to the integrator if the sum signal is greater than the multiplied $|D|$ signal, and means controlling the summing means responsive to the integrator output operative to vary the controlled fraction of the sum pulse signal to equalize the sum and combined pulse signals to maintain angular selectivity for said desired signals.

10. The system of claim 9 further including:

automatic amplifier gain control means responsive to sum signals greater than the multiplied $|D|$ signal.

11. The system of claim 9 further including:

means for guiding the system operating in dependency on the integrator output.

12. An angularly selective monopulse system for receiving desired recurrent pulse signals comprising:

a sum signal channel, a difference signal channel, summing means for combining the difference signal with a controlled fraction of the sum signal to provide a combined signal, means for delaying the combined signal, means for sequentially feeding the sum and combined signals to a third channel operating in dependency on the amplitude of the sum signal, means for amplifying the third channel signal, means for separately peak detecting two pulse signals, switch means for sequentially switching the amplified signals to the peak detector means, means for separately storing the peak detected voltages, means for sampling the stored voltages operative to supply a signal characterizing their difference D and a unipotential signal characterizing the absolute value of their difference $|D|$, comparator means operative to compare the sum signal to a predetermined multiple of the $|D|$ signal, means responsive to the comparator means for rejecting said pulse signals if the sum signal is less than the multiplied $|D|$ signal to discriminate against pulses received outside an angular range from which the desired signals are incident, integrator means, means responsive to the comparator means to transmit a signal characterizing the D signal to the integrator if the sum signal is greater than the multiplied $|D|$ signal, and means controlling the summing means responsive to the integrator output operative to vary the controlled fraction of the sum pulse signal to equalize the sum and combined pulse signal to maintain angular selectivity for said desired signals.

13. An angularly selective monopulse system for receiving desired recurrent pulse signals comprising:

a sum signal channel, a difference signal channel, means for phase shifting the difference signal, summing means for combining the phase shifted signal with a controlled fraction of the sum signal to provide a combined signal, means for delaying the combined signal, means for sequentially feeding the sum and combined signals to a third channel operating in dependency on the amplitude of the sum signal, means for amplifying the third channel signal, means for separately peak detecting two pulse signals, switch means for sequentially switching the amplified signals to the peak detector means, means for separately storing the peak detected voltages, means for sampling the stored voltages operative to supply a signal characterizing their difference D and a unipotential signal characterizing the absolute value of their difference $|D|$, comparator means operative to compare the sum signal to a predetermined multiple of the $|D|$ signal, means responsive to the comparator means for rejecting said pulse signals if the sum signal is less than the multiplied $|D|$ signal to discriminate against pulses received outside an angular range from which the desired signals are incident, integrator means, means responsive to the comparator means to transmit a signal characterizing the D signal to the integrator if the sum signal is greater than the multiplied $|D|$ signal, and means controlling the summing means responsive to the integrator output operative to vary the controlled fraction of the sum pulse signal to equalize the sum and combined pulse signals to maintain angular selectivity for said desired signals.

14. The method of angularly selecting desired received pulse signals in a monopulse system comprising:

receiving recurrent pulse signals, segregating the sum and difference signals, adding a controlled fraction of the sum to the difference signal to form a combined signal, rejecting said pulse signals if the sum signal is less than a multiple of the absolute value of the difference between the sum and combined signals, and utilizing said pulse signals if the sum signal is greater than the multiple of the absolute value of the difference between the sum and combined signals.

15. The method of claim 14 further comprising:

integrating signals characterizing the difference between the sum and combined signals when the sum signal is greater than the multiple of the absolute value of the difference between the sum and combined signals, and varying the controlled fraction of the sum signal in dependency on the integrand to maintain angular selectivity for said desired signals.

16. The method of claim 15 further comprising:
gating only the leading edge of the received pulses before forming the combined signal.

17. The method of claim 15 further comprising:
guiding the system in dependency on the integrand.

18. The method of angularly selecting desired received pulse signals in a monopulse system comprising:
receiving recurrent pulse signals,
segregating the sum and difference signals,
adding a fraction of the sum to the difference signal to form a combined signal,
delaying the combined signal,
sequentially combining the sum and combined signals,
amplifying the sequentially combined signals,
sequentially individually peak detecting the amplified sum and combined signals,
separately storing the peak signals detected,
comparing the sum and combined stored peak detected signals to derive signals characteristic of their difference D and the absolute value of their difference $|D|$,
comparing the sum signal with a predetermined multiple of the $|D|$ signal,
rejecting said pulse signals if the sum signal is less than the multiplied $|D|$ signal to angularly discriminate against undesired pulse signals,
transmitting a D characterized signal for integration if the sum signal is greater than the multiplied $|D|$ signal,
integrating said last transmitted D signals, and
varying the added fraction of the sum pulse signal in dependency on the integrand to equalize the sum and combined pulse signals to maintain angular selectivity for said desired pulse signals.

19. The method of angularly selecting desired received pulse signals in a monopulse system comprising:
receiving recurrent pulse signals,
segregating the sum and difference signals,
adding a fraction of the sum to the difference signal to form a combined signal,
delaying the combined signal,
amplitude gating the sum signal,
sequentially combining the sum and combined signals only when the sum signal is within a preselected amplitude range,
amplifying the sequentially combined signals,
sequentially individually peak detecting the amplified sum and combined signals,
separately storing the peak signals detected,
comparing the sum and combined stored peak detected signals to derive signals characteristic of their difference D and the absolute value of their difference $|D|$,
comparing the sum signal with a predetermined multiple of the $|D|$ signal,
rejecting said pulse signals if the sum is less than the multiplied $|D|$ signal to angularly discriminate against undesired pulse signals,
transmitting a D characterized signal for integration if the sum signal is greater than the multiplied $|D|$ signal,
integrating said last transmitted D signals, and
varying the added fraction of the sum pulse signal in dependency on the integrand to equalize the sum and combined pulse signals to maintain angular selectivity for said desired pulse signals.

20. The method of claim 19 further comprising:
automatically controlling the amplification gain in dependency on sum pulse amplitudes greater than the multiplied $|D|$ signal.